United States Patent

[11] 3,566,939

| [72] | Inventor | Frederick M. Hubrich |
| | | Winsted, Conn. |
| [21] | Appl. No. | 797,740 |
| [22] | Filed | Feb. 10, 1969 |
| [45] | Patented | Mar. 2, 1971 |
| [73] | Assignee | Ronson Corporation |
| | | Woodbridge, N.J. |

[54] FRUIT JUICE EXTRACTORS
7 Claims, 9 Drawing Figs.

[52] U.S. Cl. .................................................. 146/3,
 146/76
[51] Int. Cl. .................................................. A47j 19/00,
 A23n 1/02
[50] Field of Search .................................... 146/3, 3.6,
3.7, 3.8, 3.11, 76

[56] References Cited
UNITED STATES PATENTS
| 2,057,227 | 10/1936 | Blum .......................... | 146/3 |
| 2,291,028 | 7/1942 | Cummins .................... | 146/3 |

FOREIGN PATENTS
| 1,323,666 | 2/1962 | France ........................ | 146/3(.7) |

Primary Examiner—Willie G. Abercrombie
Attorney—Marvin Trimas

ABSTRACT: A wiper is removably coupled to the reamer of a fruit juice extractor for rotation therewith, the reamer and/or wiper having means thereon for selectively adjusting the height of the wiper above the surface of the juicer strainer. The pulp content of the juicer varies in accordance with the height of the wiper above the surface of the juicer strainer.

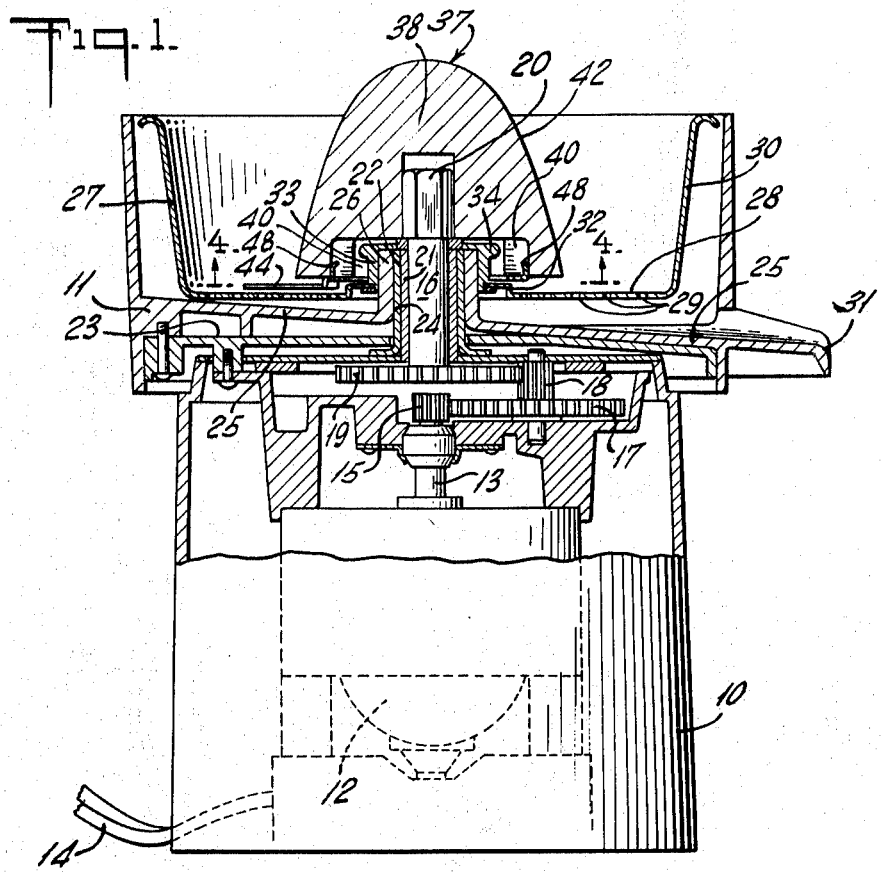
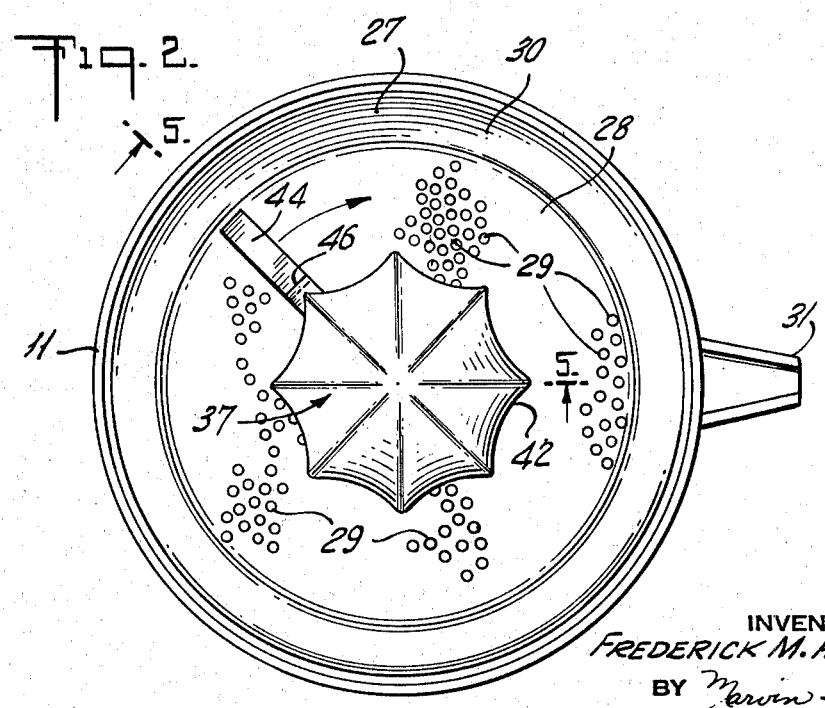

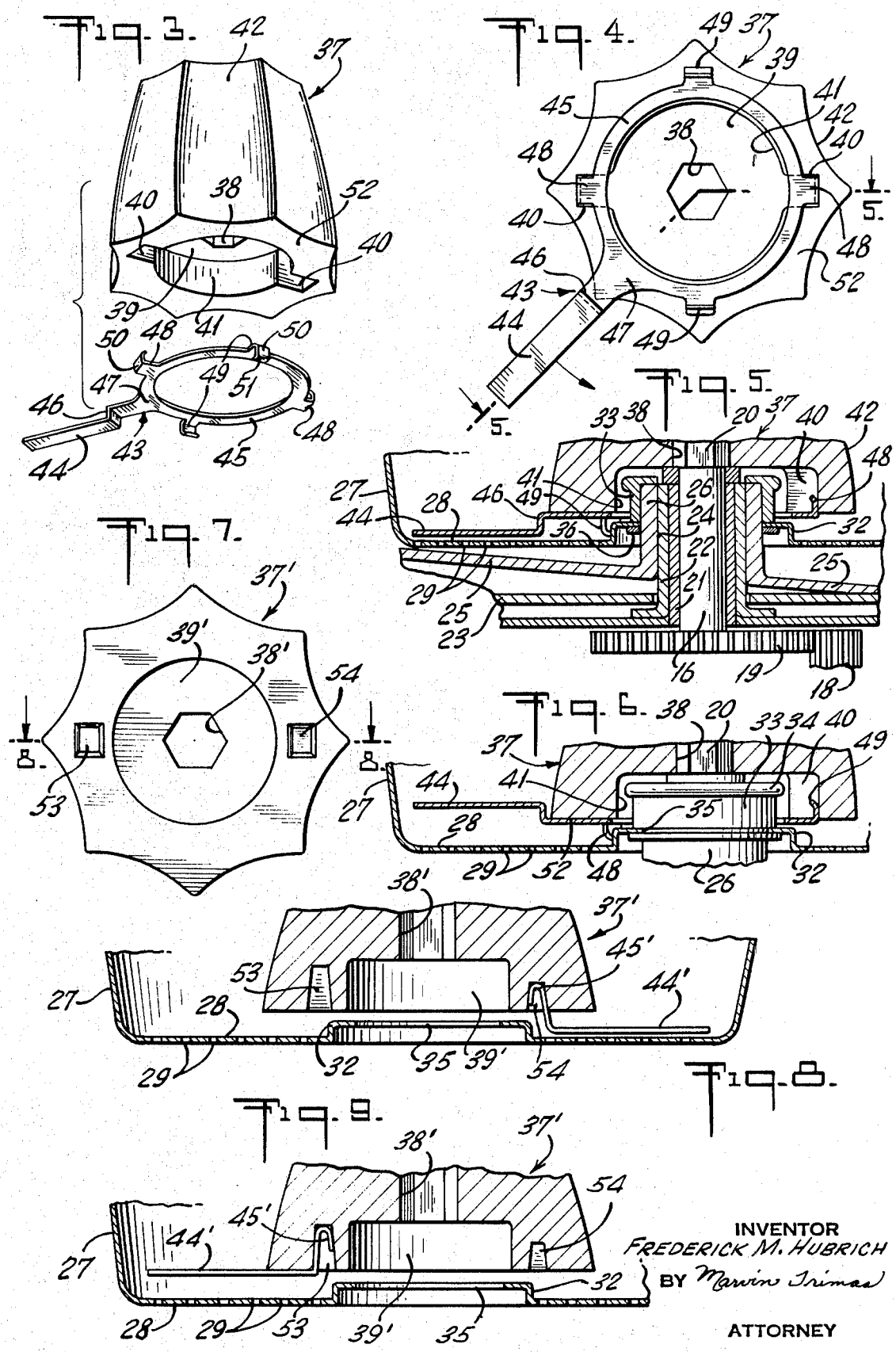

3,566,939

FRUIT JUICE EXTRACTORS

BACKGROUND OF THE INVENTION

1. Field of the Invention

This invention relates to fruit juice extractors and, more particularly, to a wiper adjustably and removably mounted to the reamer of the extractor at a point above its juice strainer for selectively determining the amount of pulp passing through the strainer.

2. Description of the Prior Art

It was recognized early in the prior art that the passage of juice, in and through a fruit juice extractor, could be appreciably hastened by attaching a wiper to the handle of a manually operated juicer or the rotating reamer of an electrically powered juicer. Such improvements were directed solely at agitating the extracted pulp lying on the juicer's strainer in order to permit the extracted juice to flow around the pulp which had formerly blocked the strainer's drain holes. In most instances, the prior art wipers only lightly scraped the top surface of the strainer, while in some other instances, the wiper was tightly urged against the strainer, either intentionally or unintentionally as a result of wear or ineffective design. Consequently, depending upon a number of variables such as the diameter of the strainer drain holes or the type of fruit being squeezed, the pulp was either haphazardly forced through strainer holes into the juice or collected in the strainer. The prior art devices lacked versatility and predictability, were not effective, and could not be adjusted to meet these or other contingencies.

SUMMARY OF THE INVENTION

This invention relates to a detachably mounted wiper, which can be operated according to the user's desire, at different heights above the surface of a fruit juice extractor's strainer. At its closest point to the strainer, most of the extracted pulp will be forced through the strainer holes. Such a result may be desired merely as a personal preference or for health reasons to obtain maximum vitamin yield from the fruit or for indicating to customers in restaurants or other public eating places that the juice has been freshly prepared from whole fruit. On the other hand, it may be desired to prepare juice which is relatively pulp-free, as would be the case in feeding the very young or those with digestive problems or those who simply prefer their juice this way. This result can be achieved by moving the wiper to its highest point above the strainer surface.

It is, therefore, an object of the present invention to provide an improved fruit juice extractor which can readily provide pulp-free or pulp-containing juice according to the user's desire.

It is another object of the present invention to provide an improved fruit juice extractor having an adjustably and removably mounted wiper coupled to the driven reamer of the extractor.

It is a further object of the present invention to provide an improved fruit juice extractor wherein the apparatus for selecting and determining pulp content of the extracted juice is simple to operate and easy to remove for cleaning and subsequent reassembly.

Accordingly, a wiper having a relatively thin blade section and a mounting section is provided for use in conjunction with the reamer of a fruit juice extractor. The blade section is formed so that, in a mounted position, it is generally parallel to the surface of the juicer's strainer. The reamer is formed with appropriately shaped receiving and retaining means which serve to capture and retain the mounting section of the wiper, thereby causing rotation of the wiper simultaneously with the driven reamer. By selecting the height of the wiper blade above the surface of the strainer, the user can control the pulp content of the extracted juice. Thus, the pulp content of the extracted juice can be varied from a negligible amount to a predetermined maximum quantity which varies according to the type of fruit being used. It is also possible, where desired, to operate the juicer with the wiper removed so that completely pulp-free juice can be extracted.

DESCRIPTION OF THE DRAWINGS

FIG. 1 is a front elevation view, partly in section, of a fruit juice extractor embodying the present invention;

FIG. 2 is a top view of the fruit juice extractor shown in FIG. 1;

FIG. 3 is an exploded perspective view of the reamer and one embodiment of the wiper according to the present invention;

FIG. 4 is an inverted plan view of the reamer and one embodiment of the wiper, as shown in FIG. 1 with certain parts omitted for clarity;

FIG. 5 is a partial sectional view of the extractor, taken along the line 5-5 of FIG. 2 and FIG. 4, showing one embodiment of the wiper in its lowest operative position;

FIG. 6 is a partial sectional view of the extractor, shown in FIG. 5, with certain parts omitted for clarity, with the wiper shown in its highest operative position;

FIG. 7 is an inverted plan view of the reamer used in conjunction with another embodiment of the wiper;

FIG. 8 is a partial sectional view of the extractor employing the reamer shown in FIG. 7, with certain parts omitted for clarity, and the corresponding wiper which is shown in its lowest operative position; and FIG. 9 is a partial sectional view of the extractor shown in FIG. 8, with certain parts omitted for clarity, with the wiper shown in its highest operative position.

DESCRIPTION OF THE PREFERRED EMBODIMENT

Referring to the drawings wherein like reference numerals have been used in the several views for like parts, FIG. 1 shows an improved electrically powered extractor wherein a wiper is employed in a manner according to the present invention which allows a user to predetermine the pulp content of the extracted juices. Although an electrically powered fruit juice extractor is described herein, the present invention is not limited to use on such apparatus and will operate satisfactorily on an extractor driven by any other means.

The improved power juicer, shown most completely in FIG. 1, comprises a base section 10 and a juicer section 11. A motor 12 is mounted within the base section 10, its shaft 13 extending upwardly towards the juicer section 11. The motor 12 is energized by connection of line cord 14 to a source of household current (not shown). The upwardly extending motor shaft 13 has a drive gear 15 fixed to its end. In turn, drive gear 15 transmits the requisite torque and speed capability to the power shaft 16 of the juicer section 11 via the appropriately positioned gear train consisting of gears 17, 18 and 19.

The power shaft 16, which is coupled to and extends upwardly from gear 19 into the juicer section 11, has a hexagonally shaped end portion 20. The power shaft 16 is encircled by a cylindrical bushing 21 which serves to retain the power shaft 16 and minimize any end play. Cylindrical flange 22, in turn, retains the bushing 21 and is fastened to the roof 23 of the base section. An aperture 24 is formed in the sloped floor 25 of the juicer section 10 by the vertically upstanding circular wall 26. The flange 22 snugly fits into aperture 24 when the juicer section 10 is mated with the base section 11 as shown in FIG. 1.

The circular strainer bowl 27 has a generally horizontal floor 28, which has a plurality of drain holes 29 through which the extracted juices and pulp are passed, and an upstanding sidewall 30 which tapers slightly outwardly to retain the strainer in its described position. The sloped floor 25 of the juicer section 10, which lies below the horizontal floor 28 of the strainer bowl 27, acts as a conduit, in that it receives the extracted juices and pulp and conducts it to the spout 31 for collection. The strainer bowl 27, the floor 25 of the juicer section 11 and the spout 31 are formed of a material which is impervious to the corrosive effects of the extracted juices and pulp. A concentric circular platform 32 is formed in the floor of the circular strainer bowl 27. A protective insert 33, which has a slightly mushroomed head 34, is fitted within a hole 35 formed in the center of platform 32. The insert 33 is retained within the platform hole 35, as best shown in FIG. 5, by locking ring 36 which securely retains the insert 33 in hole 35. Alternatively, the insert 33 can be swaged under the strainer platform 32 to retain insert 33 in the hole 35. The strainer bowl 27 is lifted out of and inserted into the juicer section 10 by grasping the head 34 of the insert 33. As can be seen from the drawings, especially FIGS. 1 and 5, the driving means housed in the base section 10 is protected from the potentially harmful effects of the extracted juices and pulp by the snug fit of insert 33 and its position well above the strainer bowl floor 28.

A reamer 37, as shown in FIGS. 1—6, preferably made of a ceramic or plastic material impervious to the corrosive effect of the extracted juices and pulp, is provided with a recessed hexagonal center hole 38. The hexagonally shaped end portion 20 of power shaft 16 is received snugly in reamer hole 38 and, consequently, causes rotation of reamer 37 upon energization of motor 12. A larger circular hole 39 which allows clearance for the insert 33 covered power shaft 16, concentric with reamer hole 38, is cut in the bottom of reamer 37. Two rectangular notches 40,40 are cut at opposite ends of a diameter of circular hole 39, one side of each of the notches 40,40 being coextensive with the circumferential sidewall 41 of circular hole 39, as is best shown in FIG. 3. The outer surface 42 of reamer 37 is fluted, as shown in FIGS. 3 and 4, in order to best operate upon the fruit being squeezed.

The wiper 43, shown in FIGS. 1—6, comprises a blade section 44 and a ring-shaped mounting section 45. Preferably, the wiper 43 is formed of a resilient metal or plastic which is impervious to the corrosive effect of the extracted juices and pulp. The blade section 44 is formed parallel to the mounting section 45, but is laterally spaced therefrom by a step 46, formed in the blade section 44 near the junction point 47 of the two sections. The mounting section 45, as shown by FIG. 3, has one set of diametrically spaced lugs 48,48 extending generally perpendicularly from one surface of the mounting section 45 and another set of diametrically spaced lugs 49,49 extending generally perpendicularly from the other surface of the mounting section 45. In addition, the lugs 48,48 and 49,49 are alternately spaced 90° from one another. The end portion 50 of each of the lugs 48,48 49 and 49 is bent back towards the mounting section 45 to describe a wedge or camming surface 51.

The wiper 43 is mated to the reamer 37 by pressing the lugs 48,48 into notches 40,40 until mounting section 45 is flush with the bottom surface 52 of reamer 37. During insertion, camming action forces lugs 48,48 toward each other, whereas after insertion the resiliency of the lug material urges them in opposite directions, thereby locking the lugs 48,48 in the notches 40,40. As shown in FIGS. 3 and 5, insertion of lugs 48,48 into the reamer 37, places the wiper 43 with its blade section 44 in its lowest operative position. By simply reversing the wiper 43, that is, by inserting lugs 49,49 into notches 40,40, the blade section 44 is moved to its highest operative position.

Reamer 37' and wiper 43', shown in FIGS. 7—9, represent an alternative and equally satisfactory embodiment of the present invention. Reamer 37' has a recessed hexagonally shaped center hole 38', as well as a larger circular clearance hole 39', concentric with reamer hole 38'. However, the two notches 53 and 54 cut in the bottom of reamer 37' differ from notches 40,40 cut in reamer 37' in that notches 53 and 54 are closed on all four sides, have upstanding walls which taper slightly towards each other and are not contiguous with the clearance hole 39', as are notches 40,40 with clearance hole 39. In addition, it is important to note that notch 53 is cut to a greater depth than notch 54 for a purpose to be hereinafter described. The notches 40,40 are cut to equal depths in reamer 37. Wiper 43' comprises a blade section 44' and an inverted J-shaped mounting section 45'. Wiper 43', like wiper 43, is also formed of a resilient metal or plastic material which is impervious to the corrosive effects of the extracted juices and pulp.

Wiper 43' is mated to reamer 37' by pressing the mounting section 45' into notch 53 or notch 54. The natural resiliency of the wiper 43' urges the necked mounting section 45' outwardly against the tapered sidewalls of the notch, thereby locking the wiper 39' within either notch 48 or notch 49. As shown in FIG. 8, the wiper 43' has been mounted in notch 53 which fixes the blade section 44' at its lowest operative position. By placing the mounting section 45' in notch 54, as shown in FIG. 9, the wiper blade section 44' is anchored in its highest operative position.

In operation, the user adjusts the wiper 43 for whatever pulp content is desired by appropriately mounting the wiper 43 within the reamer 37. After the juicer section 11 has been mated to the base section 10, the strainer bowl 27 is placed therewithin. The reamer 37-wiper 43 assembly is then fitted onto the power shaft 16. The motor 12 is energized causing rotation of its output shaft end of the power shaft 16 by means of the gear cluster 15, 17 18 and 19. The rotating power shaft 16 drives the reamer 37 and wiper 43. During rotation, the wiper blade section 44 sweeps the surface of the floor 28 of the strainer bowl 27. Depending on its height above the strainer floor 28, the wiper blade 44 will cause a predetermined amount of pulp to pass along with the extracted juices through the drain holes 29. Obviously a greater amount of pulp will be passed or rather forced through the drain holes 29 when the wiper blade 44 is set at its lowest operative position. After use the reamer 37 and wiper 43 can be easily removed for cleaning or readjustment of the wiper blade height 44. The same results will obtain if reamer 37' and wiper 43' are exchanged for their counterparts, reamer 37 and wiper 43.

Having shown and described in the drawings and specification two alternative embodiments of the present invention, it is nevertheless to be understood that various changes thereto may be made without departing from the spirit and scope of the present invention as defined in the following claims.

I claim:

1. A fruit juice extractor which comprises:
   a. a housing;
   b. drive means mounted within the housing;
   c. a strainer bowl, having a plurality of drain holes therein, removably mounted on the housing;
   d. conduit means mounted on the housing below the strainer bowl for conducting the extracted juices to a collection point;
   e. a reamer, removably and rotatably mounted in the strainer bowl, responsive to the drive means; and
   f. a wiper, removably mounted on the reamer for rotation therewith, having means thereon for adjusting the height of the wiper above the bottom surface of the strainer bowl.

2. The fruit juice extractor according to claim 1 wherein:
   a. the reamer has a plurality of notches cut in the bottom thereof; and
   b. the wiper further comprises,
      1. a mounting section having means thereon for engagement with the reamer notches, and
      2. a blade section having a step formed therein, whereby the wiper can be selectively located in either proximate or distal positions with respect to the bottom surface of the bowl.

3. The fruit juice extractor according to claim 2 wherein the wiper mounting section further comprises a ring-shaped disc having one set of lugs extending from one surface of the disc and another set of lugs extending from the other surface of the disc, the lugs corresponding in dimension to the notches cut in the reamer.

4. The fruit juice extractor according to claim 1 wherein:

a. the reamer is made from a material impervious to the corrosive effects of the extracted juices and pulp; and b. the wiper is made from a resilient material impervious to the corrosive effects of the extracted juices and pulp.

5. A fruit juice extractor which comprises:

a. a housing;

b. drive means mounted within the housing;

c. a strainer bowl, having a plurality of drain holes therein, removably mounted on the housing;

d. conduit means mounted on the housing below the strainer bowl for conducting the extracted juices to a collection point;

e. a reamer, removably and rotatably mounted in the strainer bowl, responsive to the drive means;

f. a wiper, removably mounted on the reamer for rotation therewith, having means thereof for adjusting the height of the wiper above the bottom surface of the strainer bowl wherein;

g. the reamer has two notches of differing heights cut in the bottom thereof; and h. the wiper further comprises,
 1. a mounting section having means thereon for engagement with the reamer notches, and
 2. a blade section.

6. The fruit juice extractor according to claim 5 wherein the wiper mounting section further comprises an inverted J-shaped lug whose height is approximately the same as the deepest of the two notches cut in the reamer.

7. The fruit juice extractor according to claim 1 wherein the drive means further comprises:

a. a motor mounted within the housing having a drive shaft extending therefrom; and b. power transmission means coupled to the drive shaft having a power shaft which extends into the strainer bowl, the end portion of the power shaft being formed to accept the reamer for mounting thereupon.